E. H. WAUGH.
BELLY FINNING HEAD FOR FISH CLEANING MACHINES.
APPLICATION FILED DEC. 8, 1917.

1,337,375. Patented Apr. 20, 1920.
3 SHEETS—SHEET 1.

Inventor
Edward H. Waugh
By Henry L. Reynolds
Attorney

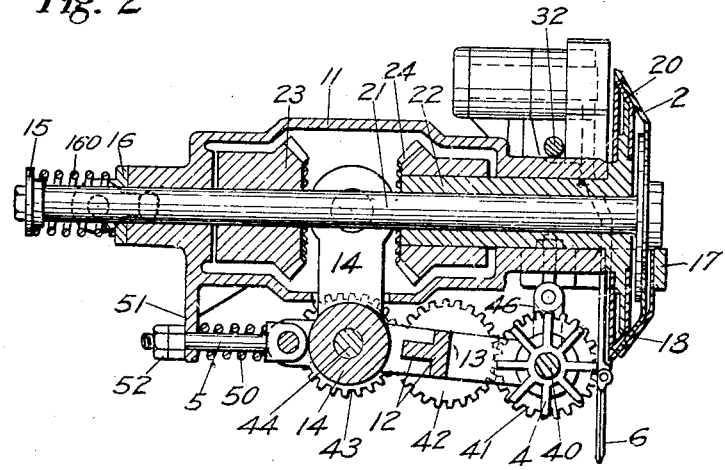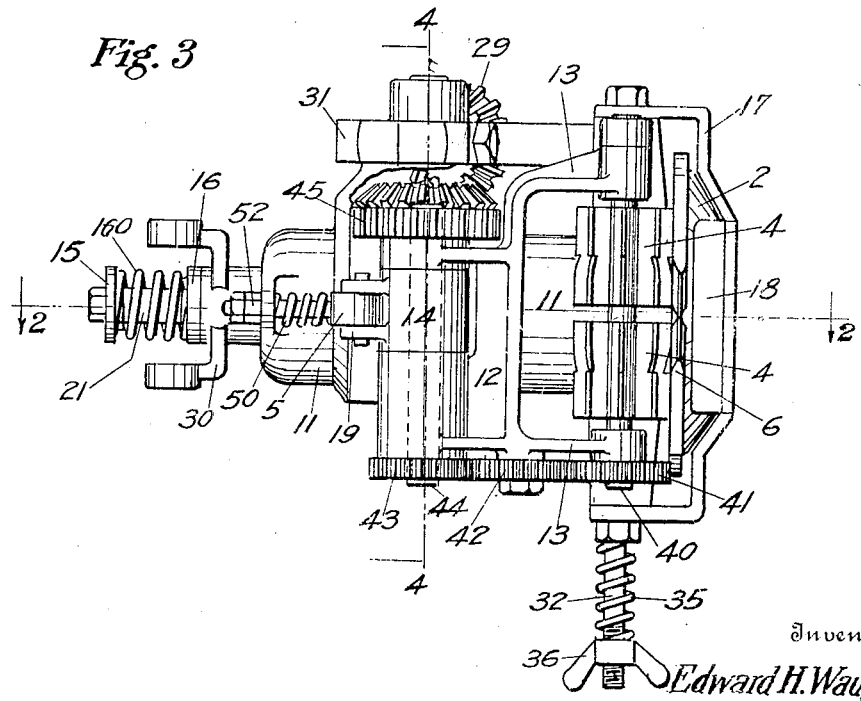

E. H. WAUGH.
BELLY FINNING HEAD FOR FISH CLEANING MACHINES.
APPLICATION FILED DEC. 8, 1917.

1,337,375.

Patented Apr. 20, 1920.
3 SHEETS—SHEET 3.

Inventor
Edward H. Waugh
By Henry L. Reynolds
Attorney

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

BELLY-FINNING HEAD FOR FISH-CLEANING MACHINES.

1,337,375.  Specification of Letters Patent.  Patented Apr. 20, 1920.

Application filed December 8, 1917. Serial No. 206,275.

*To all whom it may concern:*

Be it known that I, EDWARD H. WAUGH, a citizen of the United States, and resident of the city of Seattle, county of King, and State of Washington, have invented certain new and useful Improvements in Belly-Finning Heads for Fish-Cleaning Machines, of which the following is a specification.

My invention relates to fish cleaning machines and particularly to a part thereof which is used for removing the belly fins. It may therefore be called a belly finning head.

The object of my invention is to improve upon the devices which have heretofore been used for this purpose, whereby better results may be attained.

My present invention consists of the parts and combinations of parts which are illustrated in the accompanying drawings and defined by the claims terminating this specification.

Fig. 2 is a section taken on the axis of the cutting disks, and in the plane of movement of the fish.

Fig. 3 is a front view of the head.

Figure 1:
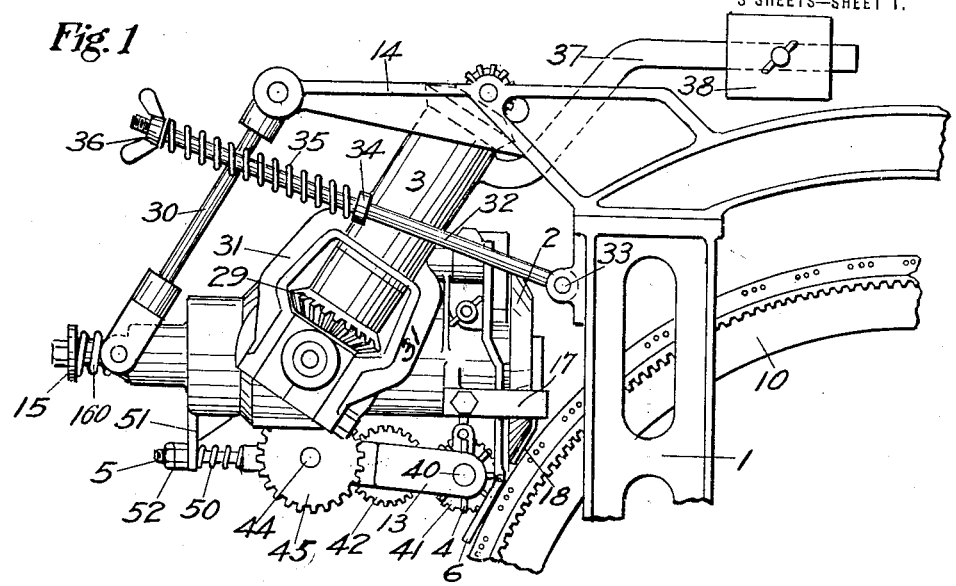
Figure 1 is a side view of my device showing enough of the machine to which it is applied to illustrate the manner of its application.
Figure 6:
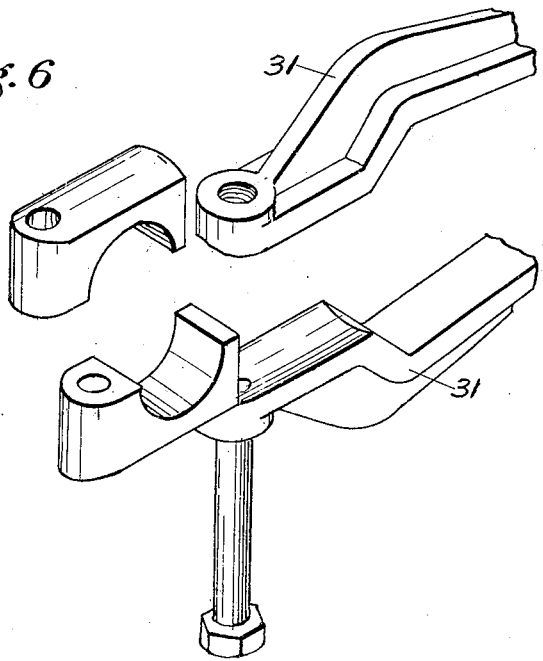
Fig. 6 shows in perspective the construction of the bearing employed at the swinging axis.
Figure 4:
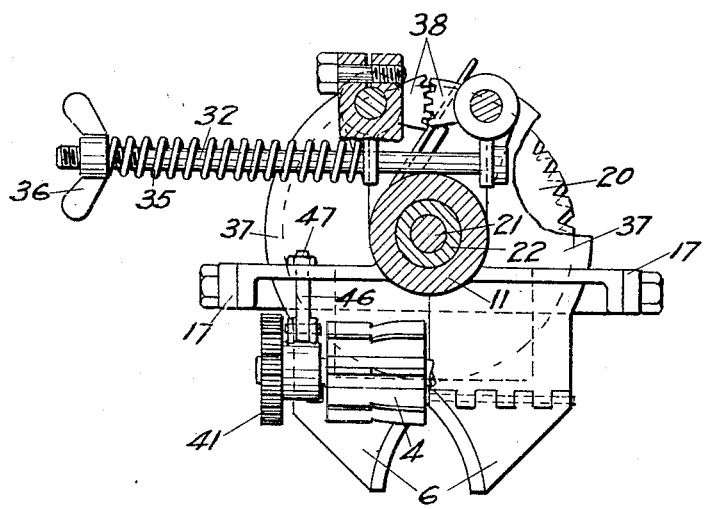
Fig. 4 is a transverse section taken in the main just above the rotative reel.
Figure 5:
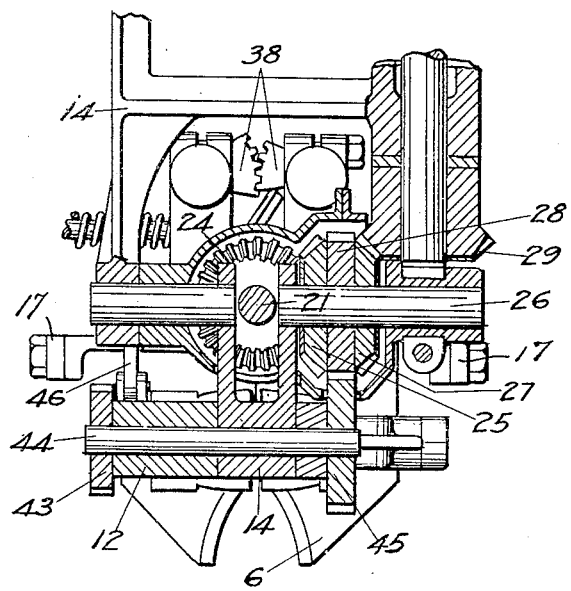
Fig. 5 is a section on a parallel plane taken through the transverse driving shafts.

My present invention is an improvement upon the belly finning heads shown in the two patents to E. A. Smith, No. 998,129 of July 18, 1911, and No. 1,034,525 of August 6, 1912. It is intended to be used on machines of this type. The description and illustration of other parts of the machine is therefore not deemed to be necessary at this time. It will suffice to say that the segments 10 represent portions of the rotative rings between which the fish are held and whereby the fish is successively presented to the various pieces of apparatus which are mounted upon or supported from the frame 1. It is contemplated that the fish be presented and handled in the same manner as is set forth in said patents.

The finning saws employed consist of saucer shaped disks 2 and 20 having teeth on their edges and are connected up so as to be turned in respectively opposite directions. This construction is, in the main, like that shown in said patents.

The shaft 21 is fixed to the outer disk 2 and is journaled in the hollow shaft 22 to which the inner disk is secured. These shafts have thereon bevel gears 24 and 23 which are oppositely driven from a bevel gear 25 which is secured to turn with a spur gear 28 and bevel gear 27, the latter being turned by a bevel gear 29. This manner of drive is essentially the same as shown in said patents.

In the present construction the inner shaft 21 is extended until it projects beyond its bearings. It is provided with two collars, 15, 16, secured thereto, although the innermost collar is free to permit slight movement lengthwise the shaft and the outer collar 15 may be adjustable as a nut on the shaft to vary the tension of the spring 160. By this expedient the two toothed disks 2 and 20 are held together in a yielding manner and with a uniform, constant pressure exerted between them. In this way a more uniform working condition and better results are secured. The pressure cannot be excessively high or low between the cutting disks.

Secured to the frame 11 which is the main frame of the finning head, is a bar 17, which extends closely under the revolving cutting disks, each end turning up and being secured to the frame 11. To this bar 17 is secured a guard or lifter plate 18, which hugs close to the cutting disks with its forward edge close up to the point of cutting. This plate prevents frictional engagement of the outer cutting disk with the fish and also serves as a presser plate or guard to control the position of the finning head by the fish itself.

The head is carried by the two members 3 and 30, both of which have pivotal supporting engagement with a frame member 14 and with the frame 11 of the head. These members therefore act as links to permit movement of the head as a whole and yet maintain it in a constant angular position.

The member 3 is hollow and contains a shaft which has the bevel gear 29 thereon and through which the parts of the head are driven.

The head is acted upon by a counterweight 38, through an arm 37, to swing the frame outward, or away from the fish carrying mechanism, and by a spring, as the spring 35, to swing the head inward. The spring as shown is a helical spring mounted upon a rod 32 which is pivoted at 33 to the frame 1 or another fixed member, and acts between the adjusting nut 36 and a guide finger 34 carried by the frame of the head. The weight 38 is adjustable as is also the tension of the spring so that the head may be nicely balanced. By the construction shown the adjustments, particularly that of the spring, are so placed as to be readily accessible. This is also true of all the adjustments provided for the various parts of the head.

The reel 4 is, in construction and function the same as in the Smith patents referred to. It is, however, mounted somewhat differently so as to have a capacity for yielding under certain conditions and also to be adjustable in position relative to the cutting disks.

The reel 4 is journaled between the arms of a yoke 13 which is a part of the frame 12. At one side a train of gears 41, 42 and 43 furnish driving connection from the shaft 44 to the shaft 40 of the reel. Shaft 44 has a gear 45 on its opposite end which meshes with gear 28.

The outer end of frame 12 is pivoted on one end of a link 14 which has its other end pivoted upon the main frame 11 of the finning head. A link 5 is pivoted between lugs 19 on the link 14, or in any other suitable way is connected with the supplemental frame 12 which carries the reel 4. This link has guided engagement with the main frame 11, as by passing through an arm or lug 51, and a spring, as 50, normally holds the reel frame toward the fish, yet permits its retracting if this be necessary.

The blades 6 are the blades which engage and raise the fins so that the saws may cut them off. These are of the former construction.

The lower end of yoke 13 is connected with main frame 11 by a link 46 which permits a limited movement of the yoke 13 and the reels 4 toward and from the fish. The position of the lower end of the yoke and reel is also adjustable slightly by adjusting the nut upon the bolt 47 to which the other end of the link 46 is pivoted.

The fin lifting and guiding plates 6 are shown in the Smith patents mentioned. These are held yieldingly together by a spring 35 mounted on a rod 32 which connects the rear ends of the plates 37, upon which the plates 6 are hinged. These plates are connected by segment gears 38 so as to move alike.

What I claim as my invention is:

1. The combination with fin cutters of a rotatable reel engaging the fish in advance of the cutters and yieldingly held toward the fish.

2. A belly finning device comprising, in combination, a frame, finning saws journaled in said frame, a fish engaging reel, a frame in which said reel is rotatable, means for carrying the reel frame from the saw frame to permit relative movement in the general direction of the axis of the saws, and a spring acting to hold the reel toward the fish.

3. The combination with fin cutters, a frame in which the cutters are mounted, a fish-engaging reel, a reel frame, means connecting said frames to permit relative movement in the direction of toward and from the fish, and a stop limiting the movement of the reel toward the fish.

4. The combination with fin cutters, a frame in which the cutters are mounted, a fish-engaging reel, a reel frame, means connecting said frames to permit relative movement in the direction of toward and from the fish, a spring acting to hold the reel toward the fish, and a stop limiting the movement of the reel toward the fish.

5. A fish finning device comprising two toothed cutting disks mounted to rotate with their cutting edges in contact, and means for yieldingly holding said disks in contact.

6. A fish finning device comprising two toothed cutting disks mounted for concentric and opposite rotation with their cutting edges in contact, and a spring holding said edges in yielding contact.

7. A fish finning device comprising two disks having conical peripheral bands nesting together and toothed means for producing relative rotation between the two and a spring yieldingly holding their cutting edges in contact.

8. A fish finning device comprising a rotatable disk having a conical peripheral margin and toothed, a complementally toothed member, means for yieldingly holding said members in contact at the fin cutting point, and means for producing relative rotary movement between the two.

9. A fish finning device comprising two rotatable disks having coned peripheral toothed margins nesting together, separate shafts for said disks, one being journaled in the other and a spring acting between said shafts to hold the disks in yielding contact.

10. A fish finning device comprising two rotatable disks having upturned outer toothed edges fitting one within the other, a shaft secured to one of these disks, a hollow shaft secured to the other disk and forming a bearing therefor, a spring acting between said shafts to yieldingly hold the toothed edges of the disks in contact, and means for oppositely rotating said disks.

11. The combination with a finning device employing two oppositely rotated cutting disks having toothed contacting edges, of a shield plate between said disks and the fish with its forward edge just back of the cutting point.

12. The combination with a finning device employing two oppositely rotated cutting disks having conically upturned and toothed contacting edges, and a guard plate interposed between said disks and the fish with its forward edge just back of the cutting point.

13. The combination with the cutting disks of a finning device of the class described, of a bar extending beneath the cutting disks and a plate supported by said bar with its forward edge just back of the cutting point of the disks.

14. In a belly finning device, the combination with the finning cutters and the frame upon which they are mounted, of a rotatable reel, a frame in which the reel is journaled, links connecting said frames to permit movement of the reel carrying frame toward and from the fish, and means for adjusting the separation of said frames at the end which carries the reel.

15. In a belly finning device, the combination with the finning cutters and the frame upon which they are mounted, of a rotatable reel, a frame in which the reel is journaled, links connecting said frames to permit movement of the reel carrying frame toward and from the fish, and adjustable means for limiting the swing of the reel frame toward the fish.

16. In a belly finning device, the combination with the finning cutters and the frame upon which they are mounted, of a rotatable reel, a frame in which the reel is journaled, links connecting said frames to permit movement of the reel carrying frame toward and from the fish, adjustable means limiting the swing of the reel and its frame toward the fish and adjustable means determining the distance of the reel from the cutter frame.

17. The combination with a finning head of the class described, of supporting means therefor comprising suspending links, a counterweight, an adjusting rod having one end fixed and the other having guiding engagement with the head and extending in the same general direction as that of the swinging movement of the head, a spring mounted on said rod, and means for adjusting the action of said spring.

18. The combination with a belly finning head of supporting means therefor comprising swinging links, a counterweight acting to swing the head in one direction, a rod secured at one end and extending outward from the head, a spring acting between said rod and the head in opposition to the counterweight, and means for adjusting the tension upon said spring.

19. The combination with a finning head, a swinging mount therefor, a counterweight acting to swing said head in one direction, a rod secured at its inner end from the frame and extending outwardly past the head, a spring upon the outer end of said rod and at its inner end engaging the head, and an adjusting nut upon the outer end of said rod engaging the outer end of the spring.

20. The combination with a finning head, parallel link suspension for said head, a counterweight acting to swing the head in one direction, a rod pivoted by its inner end to a fixed member and extending outwardly past the head, an arm carried by a swinging member and having guiding engagement with said rod, a coiled spring surrounding said rod outwardly from said arm, and an adjusting nut upon the outer end of said rod.

Signed at Seattle, Washington, this 27th day of November, 1917.

EDWARD H. WAUGH.